(12) United States Patent
Wang et al.

(10) Patent No.: US 11,851,562 B2
(45) Date of Patent: Dec. 26, 2023

(54) RESIN COMPOSITION AND ARTICLE MADE THEREFROM

(71) Applicant: Elite Electronic Material (KunShan) Co., Ltd., Kunshan (CN)

(72) Inventors: Rongtao Wang, Kunshan (CN); Zhenfang Shang, Kunshan (CN); Ningning Jia, Kunshan (CN); Chen-Yu Hsieh, Taoyuan (TW)

(73) Assignee: ELITE ELECTRONIC MATERIAL (KUNSHAN) CO., LTD., Kunshan (CN)

( * ) Notice: Subject to any disclaimer, the term of this patent is extended or adjusted under 35 U.S.C. 154(b) by 21 days.

(21) Appl. No.: 17/697,112

(22) Filed: Mar. 17, 2022

(65) Prior Publication Data

US 2023/0235172 A1 Jul. 27, 2023

(30) Foreign Application Priority Data

Jan. 25, 2022 (CN) .......................... 202210058709.1

(51) Int. Cl.
*C08L 71/12* (2006.01)
*C08J 5/18* (2006.01)
*C08J 5/24* (2006.01)

(52) U.S. Cl.
CPC ................. *C08L 71/12* (2013.01); *C08J 5/18* (2013.01); *C08J 5/249* (2021.05); C08J 2371/12 (2013.01); C08J 2379/08 (2013.01); C08L 2203/16 (2013.01)

(58) Field of Classification Search
CPC ....... C08L 71/12; C08L 2203/16; C08J 5/249; C08J 5/18; C08J 2371/12; C08J 2379/08
USPC ....................................................... 523/222
See application file for complete search history.

(56) References Cited

FOREIGN PATENT DOCUMENTS

JP 05140067 A * 6/1993

OTHER PUBLICATIONS

Choi et al., "Synthesis and Characterization of Aromatic Poly(azomethine ether)s with Different meta- and para-Phenylene Linkage Contents", Fibers and Polymers, 2020, vol. 20, No. 2, p. 238-244. (Year: 2020).*
Hosogane et al., JP 05-140067 A machine translation in English, Jun. 8, 1993. (Year: 1993).*

* cited by examiner

*Primary Examiner* — David T Karst
(74) *Attorney, Agent, or Firm* — Muncy, Geissler, Olds & Lowe, P.C.

(57) ABSTRACT

A resin composition includes a polyphenylene ether resin of Formula (1) and an additive. The additive may include maleimide resin, unsaturated C=C double bond-containing crosslinking agent, polyolefin, flame retardant, filler, curing accelerator, or a combination thereof. An article is made from the resin composition. The article includes a prepreg, a resin film, a laminate or a printed circuit board and achieves improvements in one or more properties including comparative tracking index, breakdown voltage, dissipation factor and copper foil peeling strength.

Formula (1)

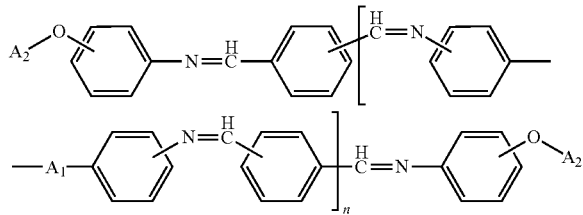

13 Claims, No Drawings

RESIN COMPOSITION AND ARTICLE MADE THEREFROM

CROSS-REFERENCE TO RELATED APPLICATION

This application claims the priority benefits of China Patent Application No. 202210058709.1, filed on Jan. 25, 2022. The entirety the above-mentioned patent application is hereby incorporated by reference herein and made a part of this specification.

BACKGROUND

1. Field of the Disclosure

The present disclosure mainly relates to a resin composition and an article made therefrom, more particularly to a resin composition useful for preparing a prepreg, a resin film, a laminate (e.g., a copper-clad laminate) and a printed circuit board, and an article made therefrom.

2. Description of Related Art

Recently, the electronic technology has been developed towards higher density, lower power consumption and higher performance, thereby presenting more challenges to the high performance electronic materials. When the surface of the insulation materials in the high performance electronic materials is polluted by contaminants with positive or negative ions, under a certain external voltage, leakage current is likely to occur on the surface of the insulation layer, thereby generating a flashover discharge. The heat and sparks generated by the discharge arc cause the surface of the insulation layer to ignite and carbonize, forming leakage channels and traces, and this phenomenon is called tracking.

For printed circuit boards, the occurrence of tracking phenomenon will lead to the decline or even the loss of insulation property, which seriously affects the insulation safety and reliability of the electronic products. Therefore, among the printed circuit boards used in humid and easily polluted environments, laminate materials with high comparative tracking index (abbreviated as CTI) have been widely used.

However, with the development of science and technology, electronic and electrical products are increasingly multi-functional and high-performance, the circuits of printed circuit boards have become more complex and dense, and the number of layers is developed toward multi-layer configuration, thereby presenting higher demands in the dielectric properties of the laminates.

The conventional high CTI FR-4 laminate adopts epoxy resin and dicyandiamide curing system, and the dissipation factor of the materials is extremely high. In order to maintain a lower dissipation factor, vinyl-containing polyphenylene ether resins are usually used, but the laminates made therefrom have a poor performance in insulation property.

Accordingly, there is an urgent need in the art to develop a new resin material with a high comparative tracking index, which especially maintains one or more properties including breakdown voltage, copper foil peeling strength and dissipation factor.

SUMMARY

To overcome the problems of prior arts, particularly one or more above-mentioned technical problems facing conventional materials, it is a primary object of the present disclosure to provide a resin composition which may overcome at least one of the above-mentioned technical problems. In addition, the present disclosure also provides an article made from the resin composition.

In one aspect, the present disclosure provides a resin composition comprising a polyphenylene ether resin of Formula (1) and an additive;

Formula (1)

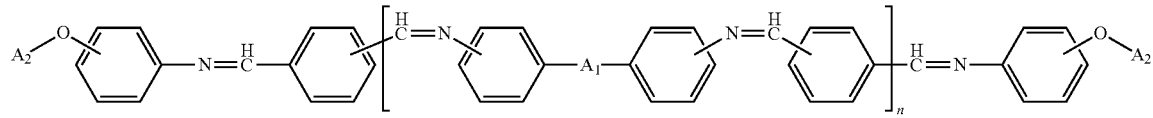

in Formula (1), n is an integer of 1 to 10, $A_1$ has a structure of Formula (2), $A_2$ each independently has a structure of Formula (6), Formula (7) or Formula (8);

Formula (2)

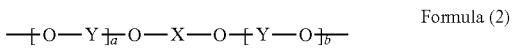

in Formula (2), a and b are each independently an integer of 0 to 100, and a and b are not 0 at the same time; —O—X—O— has a structure of Formula (3) or Formula (4); Y each independently has a structure of Formula (5);

Formula (3)

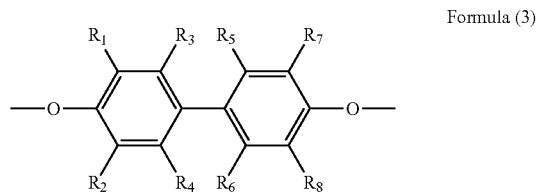

in Formula (3), $R_1$, $R_2$, $R_7$ and $R_8$ are the same or different and are each independently a C1-C6 alkyl group; $R_3$, $R_4$, $R_5$ and $R_6$ are the same or different and are each independently a hydrogen atom or a C1-C6 alkyl group;

Formula (4)

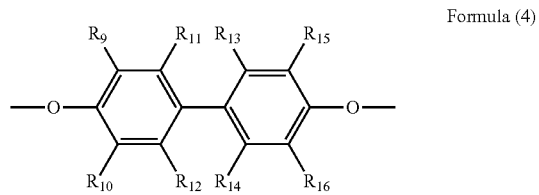

in Formula (4), $R_9$, $R_{10}$, $R_{11}$, $R_{12}$, $R_{13}$, $R_{14}$, $R_{15}$ and $R_{16}$ are the same or different and are each independently a C1-C6 alkyl group or a hydrogen atom; A is a C1-C6 divalent hydrocarbon group;

Formula (5)

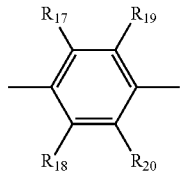

in Formula (5), $R_{17}$, $R_{18}$, $R_{19}$ and $R_{20}$ are the same or different and are each independently a hydrogen atom or a C1-C6 alkyl group;

Formula (6)

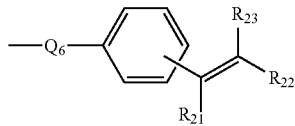

in Formula (6), $R_{21}$, $R_{22}$ and $R_{23}$ are each independently a hydrogen atom or a C1-C6 alkyl group; $Q_6$ is a C1-C6 divalent alkyl group or is not present;

Formula (7)

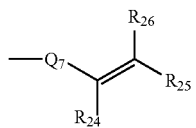

in Formula (7), $R_{24}$, $R_{25}$ and $R_{26}$ are each independently a hydrogen atom or a C1-C6 alkyl group; $Q_7$ is a C1-C6 divalent alkyl group or is not present;

Formula (8)

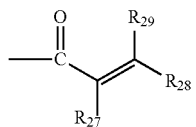

in Formula (8), $R_{27}$, $R_{28}$ and $R_{29}$ are each independently a hydrogen atom or a C1-C6 alkyl group.

In one embodiment, for example, in Formula (1), $A_2$ each independently comprises a vinyl group, a (meth)acryloyl group, an allyl group or a vinylbenzyl group.

In one embodiment, for example, the polyphenylene ether resin of Formula (1) comprises a polyphenylene ether resin of Formula (9), a polyphenylene ether resin of Formula (10), a polyphenylene ether resin of Formula (11), a polyphenylene ether resin of Formula (12), a polyphenylene ether resin of Formula (13), a polyphenylene ether resin of Formula (14), or a combination thereof:

Formula (9)

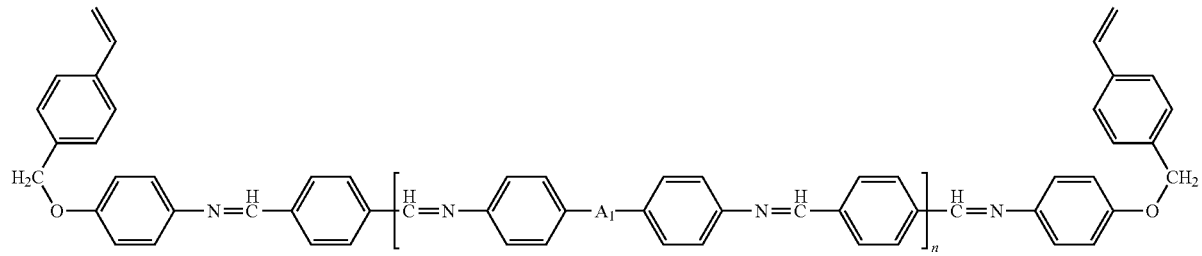

Formula (10)

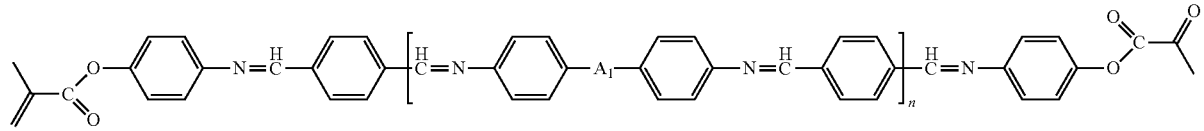

Formula (11)

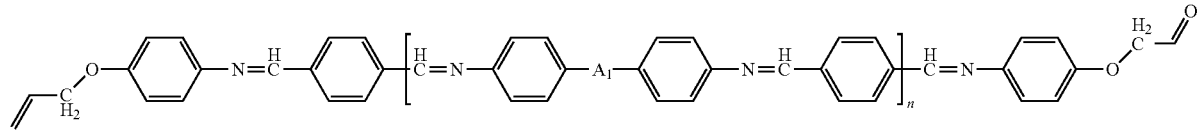

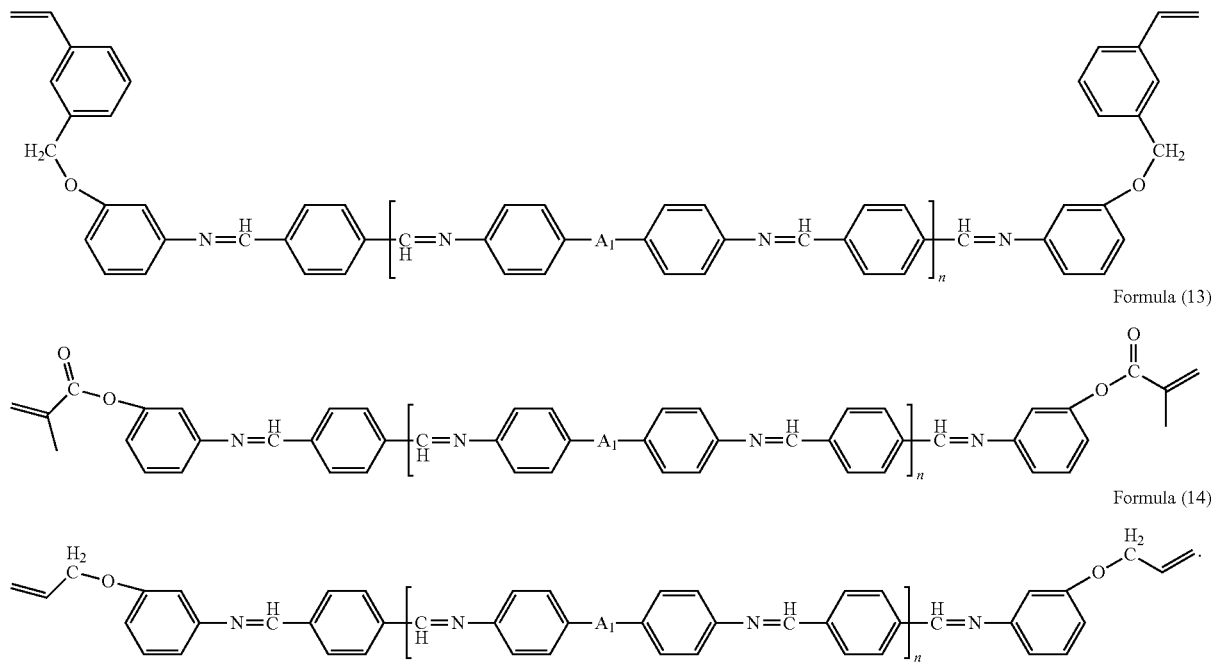

Formula (12)

Formula (13)

Formula (14)

In one embodiment, for example, the additive comprises maleimide resin, unsaturated C=C double bond-containing crosslinking agent, polyolefin, flame retardant, filler, curing accelerator or a combination thereof.

In one embodiment, for example, the resin composition comprises 100 parts by weight of the polyphenylene ether resin of Formula (1) and 0.1 to 350 parts by weight of the additive.

In one embodiment, for example, the additive comprises 5 to 30 parts by weight of the maleimide resin, 15 to 50 parts by weight of the unsaturated C=C double bond-containing crosslinking agent, 15 to 30 parts by weight of the polyolefin or a combination thereof.

In one embodiment, for example, the resin composition optionally further comprises benzoxazine resin, epoxy resin, organic silicone resin, cyanate ester resin, active ester, phenolic resin, styrene maleic anhydride, amine curing agent, polyamide, polyimide, polymerization inhibitor, silane coupling agent, surfactant, coloring agent, toughening agent, solvent, or a combination thereof.

In another aspect, the present disclosure provides an article made from the resin composition described above, which comprises a prepreg, a resin film, a laminate or a printed circuit board.

In one embodiment, for example, the article described above has one, more or all of the following properties:
a comparative tracking index as measured by reference to ASTM D3638 of greater than or equal to 300 V;
a breakdown voltage as measured by reference to IPC-TM-650 2.5.6.3 of greater than or equal to 40 kV;
a dissipation factor at 10 GHz as measured by reference to JIS C2565 of less than or equal to 0.0047; and
a copper foil peeling strength as measured by reference to IPC-TM-650 2.4.8 of greater than or equal to 2.80 lb/in.

DESCRIPTION OF THE EMBODIMENTS

To enable those skilled in the art to further appreciate the features and effects of the present disclosure, words and terms contained in the specification and appended claims are described and defined. Unless otherwise defined, all technical and scientific terms used herein have the same meaning as commonly understood by those of ordinary skill in the art to which this disclosure pertains. In the case of conflict, the present document and definitions contained herein will control.

While some theories or mechanisms may be proposed herein, the present disclosure is not bound by any theories or mechanisms described regardless of whether they are right or wrong, as long as the embodiments can be implemented according to the present disclosure.

As used herein, "the present disclosure" means "the present invention".

As used herein, "a," "an" or any similar expression is employed to describe components and features of the present disclosure. This is done merely for convenience and to give a general sense of the scope of the present disclosure. Accordingly, this description should be read to include one or at least one and the singular also includes the plural unless it is obvious to mean otherwise.

As used herein, "or a combination thereof" means "or any combination thereof", and "any" means "any one", vice versa.

As used herein, the term "encompasses," "encompassing," "comprises," "comprising," "includes," "including," "has," "having" or any other variant thereof is construed as an open-ended transitional phrase intended to cover a non-exclusive inclusion. For example, a composition or manufacture that comprises a list of elements is not necessarily limited to only those elements but may include other elements not expressly listed or inherent to such composition or manufacture. Further, unless expressly stated to the contrary, the term "or" refers to an inclusive or and not to an exclusive or. For example, a condition "A or B" is satisfied by any one of the following: A is true (or present) and B is false (or not present), A is false (or not present) and B is true (or present), and both A and B are true (or present). In addition, whenever open-ended transitional phrases are used, such as "encompasses," "encompassing," "comprises," "comprising," "includes," "including," "has," "having" or any other variant thereof, it is understood that close-ended transitional phrases such as "consisting of," "composed by" and "remainder being" and partially open-ended transitional phrases such as "consisting essentially of," "primarily consisting of," "mainly consisting of," "primarily containing," "composed essentially of," "essentially having," etc. are also disclosed and included.

In this disclosure, features and conditions such as values, numbers, contents, amounts or concentrations are presented as a numerical range or a percentage range merely for convenience and brevity. Therefore, a numerical range or a percentage range should be interpreted as encompassing and specifically disclosing all possible subranges and individual numerals or values therein, including integers and fractions, particularly all integers therein. For example, a range of "1.0 to 8.0" or "between 1.0 and 8.0" should be understood as explicitly disclosing all subranges such as 1.0 to 8.0, 1.0 to 7.0, 2.0 to 8.0, 2.0 to 6.0, 3.0 to 6.0, 4.0 to 8.0, 3.0 to 8.0 and so on and encompassing the endpoint values, particularly subranges defined by integers, as well as disclosing all individual values in the range such as 1.0, 2.0, 3.0, 4.0, 5.0, 6.0, 7.0 and 8.0. Unless otherwise defined, the aforesaid interpretation rule should be applied throughout the present disclosure regardless of broadness of the scope.

Whenever amount, concentration or other numeral or parameter is expressed as a range, a preferred range or a series of upper and lower limits, it is understood that all ranges defined by any pair of the upper limit or preferred value and the lower limit or preferred value are specifically disclosed, regardless whether these ranges are explicitly described or not. In addition, unless otherwise defined, whenever a range is mentioned, the range should be interpreted as inclusive of the endpoints and every integers and fractions in the range.

Given the intended purposes and advantages of this disclosure are achieved, numerals or figures have the precision of their significant digits. For example, 40.0 should be understood as covering a range of 39.50 to 40.49.

As used herein, a Markush group or a list of items is used to describe examples or embodiments of the present disclosure. A skilled artisan will appreciate that all subgroups of members or items and individual members or items of the Markush group or list can also be used to describe the present disclosure. For example, when X is described as being "selected from a group consisting of X1, X2 and X3," it is intended to disclose the situations of X is X1 and X is X1 and/or X2 and/or X3. In addition, when a Markush group or a list of items is used to describe examples or embodiments of the present disclosure, a skilled artisan will understand that any subgroup or any combination of the members or items in the Markush group or list may also be used to describe the present disclosure. Therefore, for example, when X is described as being "selected from a group consisting of X1, X2 and X3" and Y is described as being "selected from a group consisting of Y1, Y2 and Y3," the disclosure includes any combination of X is X1 and/or X2 and/or X3 and Y is Y1 and/or Y2 and/or Y3.

Unless otherwise specified, according to the present disclosure, a compound refers to a chemical substance formed by two or more elements bonded with chemical bonds and may comprise a small molecule compound and a polymer compound, but not limited thereto. Any compound disclosed herein is interpreted to not only include a single chemical substance but also include a class of chemical substances having the same kind of components or having the same property.

Unless otherwise specified, according to the present disclosure, a polymer refers to the product formed by monomer(s) via polymerization and usually comprises multiple aggregates of polymers respectively formed by multiple repeated simple structure units by covalent bonds; the monomer refers to the compound forming the polymer. A polymer may comprise a homopolymer, a copolymer, a prepolymer, etc., but not limited thereto. A homopolymer refers to the polymer formed by the polymerization of one monomer. Copolymers comprise: random copolymers, such as a structure of -AABABBBAAABBA-; alternating copolymers, such as a structure of -ABABABAB-; graft copolymers, such as a structure of -AA(A-BBBB)AA(A-BBBB)AAA-; and block copolymers, such as a structure of -AAAAA-BBBBBB-AAAAA-. For example, a styrene-butadiene copolymer disclosed herein is interpreted as comprising a styrene-butadiene random copolymer, a styrene-butadiene alternating copolymer, a styrene-butadiene graft copolymer or a styrene-butadiene block copolymer. A prepolymer refers to a polymer having a lower molecular weight between the molecular weight of monomer and the molecular weight of final polymer, and a prepolymer contains a reactive functional group capable of participating further polymerization to obtain the final polymer product which has been fully crosslinked or cured. The term "polymer" includes but not limited to an oligomer. An oligomer refers to a polymer with 2-20, typically 2-5, repeating units.

Unless otherwise specified, the term "resin" of the present disclosure is a widely used common name of a synthetic polymer and is construed as comprising monomer and its combination, polymer and its combination or a combination of monomer and its polymer, but not limited thereto.

Unless otherwise specified, according to the present disclosure, a modification comprises a product derived from a resin with its reactive functional group modified, a product derived from a prepolymerization reaction of a resin and other resins, a product derived from a crosslinking reaction of a resin and other resins, a product derived from copolymerizing a resin and other resins, etc.

The unsaturated bond described herein, unless otherwise specified, refers to a reactive unsaturated bond, such as but not limited to an unsaturated double bond with the potential of being crosslinked with other functional groups, such as an unsaturated C=C double bond with the potential of being crosslinked with other functional groups, but not limited thereto.

The unsaturated C=C double bond used herein preferably comprises, but not limited to, a vinyl group, a vinylbenzyl group, a (meth)acryloyl group, an allyl group or a combination thereof. The term "vinyl group" is construed as comprising a vinyl group and a vinylene group. The term "(meth)acryloyl group" is construed as comprising an acryloyl group and a methacryloyl group.

Unless otherwise specified, the hydrocarbyl group described herein comprises, but not limited to, an alkyl group, an alkenyl group or an alkynyl group, and is construed to encompass various isomers thereof. For example, a C1-C6 divalent hydrocarbon group is construed to encompass a C1-C6 divalent straight chain hydrocarbon group, a C2-C6 divalent branched chain hydrocarbon group, or a C3-C6 divalent cyclic hydrocarbon group. For example, a propyl group is construed to encompass n-propyl and iso-propyl.

Unless otherwise specified, as used herein, part(s) by weight represents weight part(s) in any weight unit in the resin composition, such as but not limited to kilogram, gram, pound and so on. For example, 100 parts by weight of a polyphenylene ether resin may represent 100 kilograms of the polyphenylene ether resin or 100 pounds of the polyphenylene ether resin.

It should be understood that all features disclosed herein may be combined in any way to constitute the solution of the present disclosure, as long as there is no conflict present in the combination of these features.

Examples and embodiments are described in detail below. It will be understood that these examples and embodiments are exemplary only and are not intended to limit the scope and use of the present disclosure. Unless otherwise specified, processes, reagents and conditions described in the examples are those known in the art.

The present disclosure provides a resin composition, comprising a polyphenylene ether resin of Formula (1) and an additive;

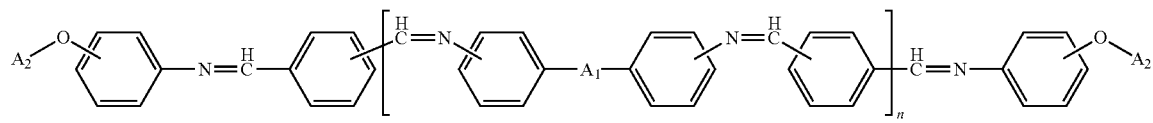

Formula (1)

in Formula (1), n is an integer of 1 to 10 (such as 1, 2, 3, 4, 5, 6, 7, 8, 9 or 10), $A_1$ has a structure of Formula (2), and $A_2$ each independently has a structure of Formula (6), Formula (7), or Formula (8);

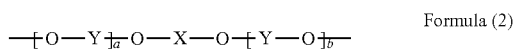

Formula (2)

in Formula (2), a and b are each independently an integer of 0 to 100 (such as 0, 10, 20, 30, 40, 50, 60, 70, 80, 90 or 100, preferably an integer of 1 to 30, more preferably an integer of 1 to 10), and a and b are not 0 at the same time; —O—X—O— has a structure of Formula (3) or Formula (4); Y each independently has a structure of Formula (5);

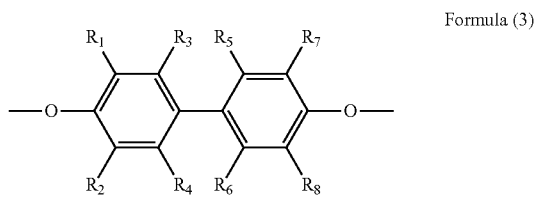

Formula (3)

in Formula (3), $R_1$, $R_2$, $R_7$ and $R_8$ are the same or different and are each independently a C1-C6 alkyl group (e.g., C1-C3 alkyl, such as methyl); $R_3$, $R_4$, $R_5$ and $R_6$ are the same or different and are each independently a hydrogen atom or a C1-C6 alkyl group (e.g., C1-C3 alkyl, such as methyl);

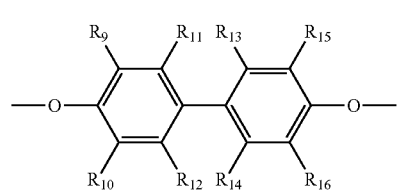

Formula (4)

in Formula (4), $R_9$, $R_{10}$, $R_{11}$, $R_{12}$, $R_{13}$, $R_{14}$, $R_{15}$ and $R_{16}$ are the same or different and are each independently a C1-C6 alkyl group (e.g., C1-C3 alkyl, such as methyl) or a hydrogen atom; A is a C1-C6 divalent hydrocarbon group (e.g., methylene, ethylene, propylene, etc.; for example, A may be —$CH_2$— or —$C(CH_3)_2$—);

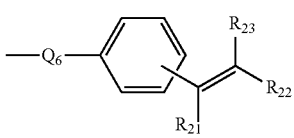

Formula (5)

in Formula (5), $R_{17}$, $R_{18}$, $R_{19}$ and $R_{20}$ are the same or different and are each independently a hydrogen atom or a C1-C6 alkyl group (e.g., C1-C3 alkyl, such as methyl);

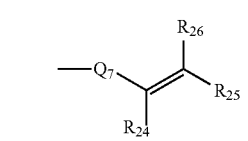

Formula (6)

in Formula (6), $R_{21}$, $R_{22}$ and $R_{23}$ are each independently a hydrogen atom or a C1-C6 alkyl group (e.g., C1-C3 alkyl, such as methyl); $Q_6$ is a C1-C6 divalent alkyl group (e.g., methylene, ethylene, propylene, etc.) or is not present;

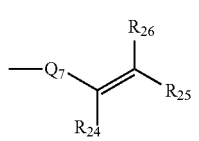

Formula (7)

in Formula (7), $R_{24}$, $R_{25}$ and $R_{26}$ are each independently a hydrogen atom or a C1-C6 alkyl group (e.g., C1-C3 alkyl, such as methyl); $Q_7$ is a C1-C6 divalent alkyl group (e.g., methylene, ethylene, propylene, etc.) or is not present;

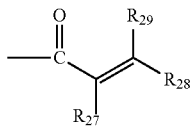
Formula (8)

in Formula (8), $R_{27}$, $R_{28}$ and $R_{29}$ are each independently a hydrogen atom or a C1-C6 alkyl group (e.g., C1-C3 alkyl, such as methyl).

In one embodiment, for example, in Formula (1), $A_2$ each independently comprises a vinyl group, a (meth)acryloyl group, an allyl group or a vinylbenzyl group.

In one embodiment, for example, the polyphenylene ether resin of Formula (1) comprises a polyphenylene ether resin of Formula (9), a polyphenylene ether resin of Formula (10), a polyphenylene ether resin of Formula (11), a polyphenylene ether resin of Formula (12), a polyphenylene ether resin of Formula (13), a polyphenylene ether resin of Formula (14), or a combination thereof:

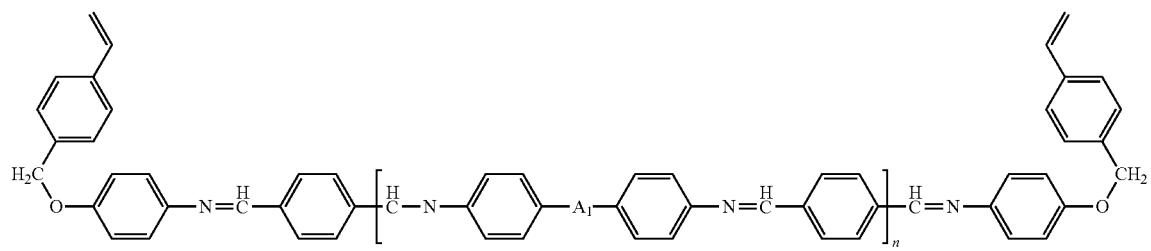
Formula (9)

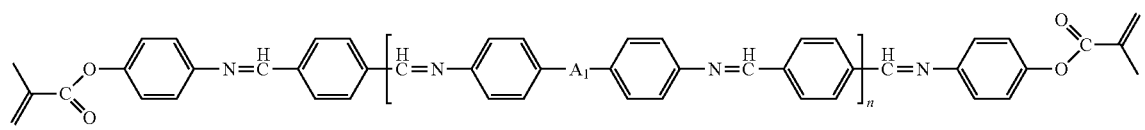
Formula (10)

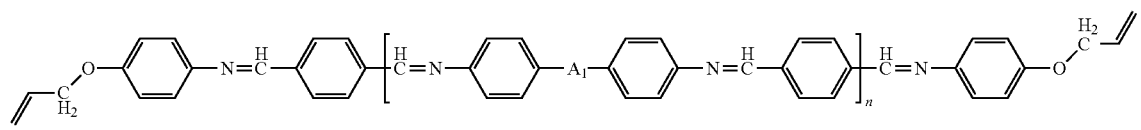
Formula (11)

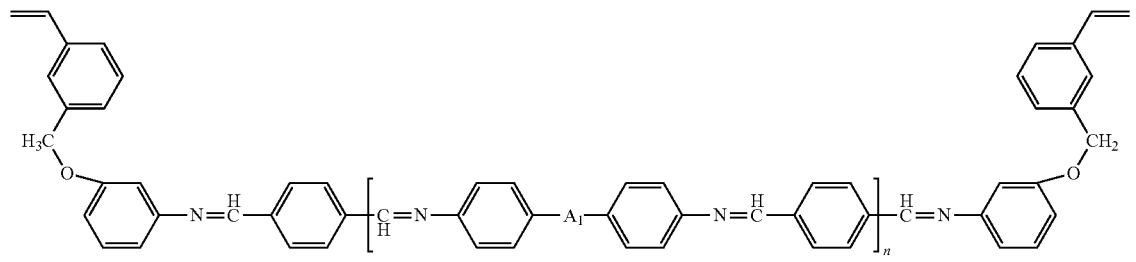
Formula (12)

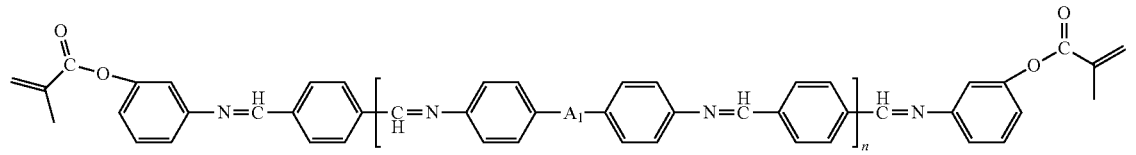
Formula (13)

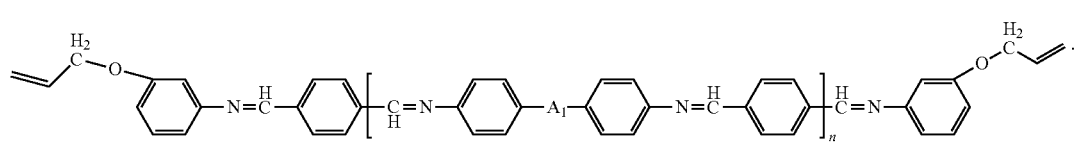
Formula (14)

The number average molecular weight (Mn) of the polyphenylene ether resin of Formula (1) described herein is preferably 3000 to 25000, more preferably 4000 to 20000, even more preferably 4000 to 5000, but not limited thereto.

The polyphenylene ether resin of Formula (1) according to the present disclosure may be prepared by the following method: (1) reacting a diamino-terminated polyphenylene ether resin (having a structure of Formula (15), wherein $A_1$ is defined as above) with a phthalaldehyde and an aminophenol and controlling the reaction temperature at 60° C. to 120° C. for a period of 1 to 8 hours to obtain an intermediate; and (2) reacting the intermediate with an unsaturated C=C double bond-containing halide (a halide having a structure of Formula (6), Formula (7) or Formula (8)) and controlling the reaction temperature at 60° C. to 120° C. for a period of 1 to 6 hours so as to obtain the polyphenylene ether resin of Formula (1).

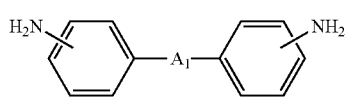

Formula (15)

Optionally, in step (1), a proper amount of solvent can be added, such as but not limited to ketone (e.g., acetone or methyl ethyl ketone), toluene or a combination thereof, preferably toluene.

Optionally, in step (2), an alkaline solution can be further added, such as but not limited to sodium hydroxide solution, potassium hydroxide solution, triethylamine, potassium tert-butoxide or a combination thereof, preferably sodium hydroxide solution.

In the aforesaid method, the molar ratio of diamino-terminated polyphenylene ether resin (having a structure of Formula (15), wherein $A_1$ is defined as above), phthalaldehyde, aminophenol, and unsaturated C=C double bond-containing halide (a halide having a structure of Formula (6), Formula (7) or Formula (8)) is not particularly limited; for example, but not limited to, relative to 1 mole of the diamino-terminated polyphenylene ether resin (having a structure of Formula (15), wherein $A_1$ is defined as above), the amount of phthalaldehyde is 1 to 5 moles, the amount of aminophenol is 0.5 to 5.5 moles, and the amount of unsaturated C=C double bond-containing halide (a halide having a structure of Formula (6), Formula (7) or Formula (8)) is 2 to 8 moles. Preferably, relative to 1 mole of diamino-terminated polyphenylene ether resin (having a structure of Formula (15), wherein $A_1$ is defined as above), the amount of phthalaldehyde is 2 to 4 moles, the amount of aminophenol is 1.5 to 4.5 moles, and the amount of unsaturated C=C double bond-containing halide (a halide having a structure of Formula (6), Formula (7) or Formula (8)) is 3 to 7 moles.

The aforesaid diamino-terminated polyphenylene ether resin (having a structure of Formula (15), wherein $A_1$ is defined as above) is not particularly limited and may comprise various commercially available products or products prepared by the Applicant. For example, but not limited to, it may be available from Sabic.

The aforesaid phthalaldehyde is not particularly limited and may comprise various commercial products. Examples include but are not limited to p-phthalaldehyde, o-phthalaldehyde, m-phthalaldehyde or a combination thereof, preferably p-phthalaldehyde.

The aforesaid aminophenol is not particularly limited and may comprise various commercial products. Examples include but are not limited to p-aminophenol, o-aminophenol, m-aminophenol or a combination thereof, preferably p-aminophenol.

The aforesaid unsaturated C=C double bond-containing halide (a halide having a structure of Formula (6), Formula (7) or Formula (8)) is not particularly limited and may comprise various commercial products. Examples include but are not limited to chloromethyl styrene, vinyl chloride, allyl chloride, acryloyl chloride, methacryloyl chloride or a combination thereof. The chloromethyl styrene may comprise, but not limited to, 4-chloro-methyl styrene, 3-chloro-methyl styrene, 2-chloro-methyl styrene or a combination thereof.

Unless otherwise specified, according to the resin composition of the present disclosure, the amount of each component contained in the resin composition is represented as the amount relative to a total of 100 parts by weight of the polyphenylene ether resin of Formula (1), and the amount of the additive is not particularly limited. For example, but not limited thereto, relative to a total of 100 parts by weight of the polyphenylene ether resin of Formula (1), the total amount of the additive (may be one or more additives) may be 0.1 part by weight to 350 parts by weight, preferably 50 parts by weight to 300 parts by weight, more preferably 100 parts by weight to 230 parts by weight. For example, relative to a total of 100 parts by weight of the polyphenylene ether resin of Formula (1), the total amount of the additive may be 0.1, 0.3, 0.5, 1, 5, 10, 15, 20, 30, 40, 50, 60, 70, 80, 90, 100, 120, 150, 200, 250, 300 or 350 parts by weight. If two or more additives are used, the ratio therebetween can be adjusted according to the need.

In one embodiment, for example, the resin composition comprises 100 parts by weight of the polyphenylene ether resin of Formula (1) and 0.1 to 350 parts by weight of the additive.

In one embodiment, for example, the additive comprises maleimide resin, unsaturated C=C double bond-containing crosslinking agent, polyolefin, flame retardant, filler, curing accelerator, or a combination thereof.

In one embodiment, for example, the additive includes filler and curing accelerator.

In one embodiment, for example, the additive includes maleimide resin, unsaturated C=C double bond-containing crosslinking agent, filler and curing accelerator.

In one embodiment, for example, the additive includes maleimide resin, unsaturated C=C double bond-containing crosslinking agent, polyolefin, flame retardant, filler and curing accelerator.

For example, unless otherwise specified, relative to a total of 100 parts by weight of the polyphenylene ether resin of Formula (1), the amount of the maleimide resin described above may be 1 part by weight to 40 parts by weight, preferably 5 parts by weight to 30 parts by weight.

The maleimide resin suitable for the resin composition of the present disclosure is not particularly limited and may include any one or more maleimide resins useful for preparing a prepreg, a resin film, a laminate or a printed circuit board. In some embodiments, the maleimide resin may include but not limited to: 4,4'-diphenylmethane bismaleimide, polyphenylmethane maleimide (a.k.a. oligomer of phenylmethane maleimide), bisphenol A diphenyl ether bismaleimide, 3,3'-dimethyl-5,5'-diethyl-4,4'-diphenylmethane bismaleimide, 3,3'-dimethyl-5,5'-dipropyl-4,4'-diphenylmethane bismaleimide, m-phenylene bismaleimide, 4-methyl-1,3-phenylene bismaleimide, 1,6-bismaleimide-(2,2,4-trimethyl)hexane, N-2,3-xylylmaleimide, N-2,6-xylylmaleimide, N-phenylmaleimide, vinyl benzyl maleimide (VBM), maleimide containing a biphenyl structure, maleimide resin containing aliphatic long chain structure, prepolymer of diallyl compound and maleimide resin, prepolymer of diamine and maleimide resin, prepolymer of multifunctional amine and maleimide resin, prepolymer of acid phenol compound and maleimide resin, or a combination thereof. These components should be construed as including their modifications.

For example, the maleimide resin includes but is not limited to products such as BMI-1000, BMI-1000H, BMI-1100, BMI-1100H, BMI-2000, BMI-2300, BMI-3000, BMI-3000H, BMI-4000, BMI-5000, BMI-5100, BMI-TMH, BMI-7000, and BMI-7000H available from Daiwakasei Industry, products such as BMI-70 and BMI-80 available from K.I Chemical Industry Co., Ltd., or products such as MIR-3000 and MIR-5000 available from Nippon Kayaku.

For example, the maleimide resin containing aliphatic long chain structure, also known as imide-extended maleimide resin, may include various imide-extended maleimide resins disclosed in the TW Patent Application Publication No. 200508284A, all of which are incorporated herein by reference in their entirety. The maleimide resin containing aliphatic long chain structure suitable for the present disclosure may include but not limited to products such as BMI-689, BMI-1400, BMI-1500, BMI-1700, BMI-2500, BMI-3000, BMI-5000 and BMI-6000 available from Designer Molecules Inc.

For example, unless otherwise specified, relative to a total of 100 parts by weight of the polyphenylene ether resin of Formula (1), the amount of the unsaturated C=C double bond-containing crosslinking agent described above may be 1 part by weight to 60 parts by weight, preferably 15 parts by weight to 50 parts by weight.

For example, the unsaturated C=C double bond-containing crosslinking agent is 1,2-bis(vinylphenyl)ethane, bis(vinylbenzyl)ether, divinylbenzene, divinylnaphthalene, divinylbiphenyl, t-butyl styrene, triallyl isocyanurate, triallyl cyanurate, 1,2,4-trivinyl cyclohexane, diallyl bisphenol A, styrene, butadiene, decadiene, octadiene, vinylcarbazole, acrylate, or a combination thereof. These components should be construed as including their isomers or polymers.

For example, unless otherwise specified, relative to a total of 100 parts by weight of the polyphenylene ether resin of Formula (1), the amount of the polyolefin described above may be 1 part by weight to 40 parts by weight, preferably 15 parts by weight to 30 parts by weight.

The polyolefin suitable for the present disclosure is not particularly limited and may include any one or more olefin polymers useful for making a prepreg, a resin film, a laminate, or a printed circuit board, such as any one or more commercial products, products prepared by the Applicant or a combination thereof.

For example, the polyolefin may include but not limited to diene polymer, monoene polymer, hydrogenated diene polymer or a combination thereof. The diene refers to a hydrocarbon compound containing two unsaturated C=C double bonds in the molecule, and the monoene refers to a hydrocarbon compound containing one unsaturated C=C double bond in the molecule. The number average molecular weight of polyolefin generally ranges from 1000 to 150000. Because the polyolefin has a higher molecular weight and has a main chain containing regularly arranged carbon-carbon bonds, it has low molecular polarity which can improve the dielectric properties of the cured product.

In some embodiments, examples of the polyolefin include but are not limited to: polybutadiene, polyisoprene, styrene-butadiene copolymer, styrene-isoprene copolymer, styrene-butadiene-divinylbenzene terpolymer, styrene-butadiene-maleic anhydride terpolymer, vinyl-polybutadiene-urethane oligomer, maleic anhydride-butadiene copolymer, polymethylstyrene, hydrogenated polybutadiene, hydrogenated styrene-butadiene-divinylbenzene terpolymer, hydrogenated styrene-butadiene-maleic anhydride terpolymer, hydrogenated styrene-butadiene copolymer, hydrogenated styrene-isoprene copolymer or a combination thereof. These components should be construed as including their modifications.

In some embodiments, the polyolefin is preferably butadiene-based diene polymer, isoprene-based diene polymer, hydrogenated butadiene-based diene polymer, hydrogenated isoprene-based diene polymer or a combination thereof. Examples include but are not limited to: polybutadiene, hydrogenated polybutadiene, polyisoprene, styrene-butadiene copolymer, hydrogenated styrene-butadiene copolymer, styrene-isoprene copolymer, hydrogenated styrene-isoprene copolymer, styrene-butadiene-divinylbenzene terpolymer, styrene-butadiene-maleic anhydride terpolymer, hydrogenated styrene-butadiene-divinylbenzene terpolymer, hydrogenated styrene-butadiene-maleic anhydride terpolymer, vinyl-polybutadiene-urethane oligomer, maleic anhydride-butadiene copolymer, or a combination thereof.

For example, unless otherwise specified, relative to a total of 100 parts by weight of the polyphenylene ether resin of Formula (1), the amount of the flame retardant described above may be 1 part by weight to 65 parts by weight, preferably 10 parts by weight to 55 parts by weight.

The flame retardant suitable for the resin composition of the present disclosure may be any one or more flame retardants useful for preparing a prepreg, a resin film, a laminate, or a printed circuit board, examples including but not limited to bromine-containing flame retardant or phosphorus-containing flame retardant, the bromine-containing flame retardant preferably comprising decabromodiphenyl ethane, and the phosphorus-containing flame retardant preferably comprising: ammonium polyphosphate, p-hydroquinone bis-(diphenyl phosphate), bisphenol A bis-(diphenylphosphate), tri(2-carboxyethyl) phosphine (TCEP), phosphoric acid tris(chloroisopropyl) ester, trimethyl phosphate (TMP), dimethyl methyl phosphonate (DMMP), resorcinol bis(dixylenyl phosphate) (RDXP, such as commercially available PX-200, PX-201, and PX-202), phosphazene (such as commercially available SPB-100, SPH-100, and SPV-100), melamine polyphosphate, 9,10-dihydro-9-oxa-10-phosphaphenanthrene-10-oxide (DOPO) and its derivatives or resins, diphenylphosphine oxide (DPPO) and its derivatives or resins, melamine cyanurate, tri-hydroxy ethyl isocyanurate, aluminium phosphinate (e.g., commercially available OP-930 and OP-935), or a combination thereof.

For example, the DPPO compound may be a di-DPPO compound. The DOPO compound may comprise di-DOPO compound, DOPO-HQ, DOPO-NQ or vinyl-containing DOPO compound. Examples of the DOPO resin comprise, but not limited to, DOPO-containing novolac resin or DOPO-containing epoxy resin, wherein the DOPO-containing novolac resin includes but not limited to DOPO-containing phenol novolac resin (DOPO-PN) or DOPO-containing bisphenol novolac resin, such as DOPO-containing bisphenol A novolac resin (DOPO-BPAN), DOPO-containing bisphenol F novolac resin (DOPO-BPFN) and DOPO-containing bisphenol S novolac resin (DOPO-BPSN).

Preferably, the flame retardant comprises DOPO compound and its derivatives or resins, phosphate ester or a combination thereof.

For example, unless otherwise specified, relative to a total of 100 parts by weight of the polyphenylene ether resin of Formula (1), the amount of the filler described above may be 10 parts by weight to 210 parts by weight, preferably 20 parts by weight to 200 parts by weight.

The filler suitable for the present disclosure may be any one or more inorganic fillers or organic fillers useful for preparing a prepreg, a resin film, a laminate or a printed circuit board. Examples of the inorganic filler include but are not limited to: silica (fused, non-fused, porous or hollow type), aluminum oxide, aluminum hydroxide, magnesium oxide, magnesium hydroxide, calcium carbonate, aluminum nitride, boron nitride, aluminum silicon carbide, silicon carbide, titanium dioxide, barium titanate, lead titanate, strontium titanate, calcium titanate, magnesium titanate, barium zirconate, lead zirconate, magnesium zirconate, lead zirconate titanate, zinc molybdate, calcium molybdate, magnesium molybdate, zinc molybdate-modified talc, zinc oxide, zirconium oxide, mica, boehmite (AlOOH), calcined talc, talc, silicon nitride, calcined kaolin, or a combination thereof. Moreover, the inorganic filler can be spherical (including solid sphere or hollow sphere), fibrous, plate-like, particulate, flake-like or whisker-like and can be optionally pretreated by a silane coupling agent. Examples of the organic filler include but are not limited to: polytetrafluoroethylene, polyphenylene sulfide, polyethersulfone or a combination thereof.

For example, unless otherwise specified, relative to a total of 100 parts by weight of the polyphenylene ether resin of Formula (1), the amount of the curing accelerator may be 0.1 part by weight to 2.0 parts by weight, preferably 0.5 part by weight to 1.8 parts by weight.

The curing accelerator suitable for the present disclosure may comprise a catalyst, such as a Lewis base or a Lewis acid. The Lewis base may comprise imidazole, boron trifluoride-amine complex, ethyltriphenyl phosphonium chloride, 2-methylimidazole (2MI), 2-phenyl-1H-imidazole (2PZ), 2-ethyl-4-methylimidazole (2E4MI), triphenylphosphine (TPP) and 4-dimethylaminopyridine (DMAP) or a combination thereof. The Lewis acid may comprise metal salt compounds, such as those of manganese, iron, cobalt, nickel, copper and zinc, such as zinc octanoate or cobalt octanoate. The curing accelerator encompasses curing initiator, including various compounds capable of producing free radicals, such as a peroxide capable of producing free radicals; the curing initiator may comprise, but not limited to: dibenzoyl peroxide (BPO), dicumyl peroxide, 2,5-dimethyl-2,5-di(t-butylperoxy)hexane, 2,5-dimethyl-2,5-di(t-butylperoxy)-3-hexyne (25B), di-t-butyl peroxide, di(t-butylperoxy isopropyl)benzene, di(t-butylperoxy)phthalate, di(t-butylperoxy)isophthalate, t-butyl peroxybenzoate, 2,2-di(t-butylperoxy)butane, 2,2-di(t-butylperoxy)octane, 2,5-dimethyl-2,5-di(benzoylperoxy)hexane, lauroyl peroxide, t-hexyl peroxypivalate, dibutylperoxyisopropylbenzene, bis (4-t-butylcyclohexyl) peroxydicarbonate or a combination thereof.

For example, in one embodiment, the resin composition disclosed herein comprises, in addition to 100 parts by weight of the polyphenylene ether resin of Formula (1), 5 parts by weight to 30 parts by weight of the maleimide resin, 15 parts by weight to 50 parts by weight of the unsaturated C=C double bond-containing crosslinking agent, 15 parts by weight to 30 parts by weight of the polyolefin or a combination thereof.

For example, in one embodiment, the resin composition disclosed herein may further comprise benzoxazine resin, epoxy resin, organic silicone resin, cyanate ester resin, active ester, phenolic resin, styrene maleic anhydride, amine curing agent, polyamide, polyimide, polymerization inhibitor, silane coupling agent, surfactant, coloring agent, toughening agent, solvent, or a combination thereof. These components should be construed as including their modifications.

For example, unless otherwise specified, relative to a total of 100 parts by weight of the polyphenylene ether resin of Formula (1), the amount of any one of benzoxazine resin, epoxy resin, organic silicone resin, cyanate ester resin, active ester, phenolic resin, styrene maleic anhydride, amine curing agent, polyamide and polyimide may range from 1 part by weight to 200 parts by weight (such as but not limited to 1, 5, 10, 15, 20, 30, 40, 50, 60, 70, 80, 90, 100, 120, 150 or 200 parts by weight), and the ratio therebetween can be adjusted according to the need. Unless otherwise specified, relative to a total of 100 parts by weight of the polyphenylene ether resin of Formula (1), the amount of any one of polymerization inhibitor, silane coupling agent, surfactant, coloring agent and toughening agent may range from 1 part by weight to 20 parts by weight (such as but not limited to 1, 5, 10, 15 or 20 parts by weight), and the ratio therebetween can be adjusted according to the need.

Examples of the benzoxazine resin suitable for the resin composition of the present disclosure are not particularly limited and may comprise any benzoxazine resin known in the art to which this disclosure pertains; examples include but are not limited to bisphenol A benzoxazine resin, bisphenol F benzoxazine resin, phenolphthalein benzoxazine resin, dicyclopentadiene benzoxazine resin, phosphorus-containing benzoxazine resin, diamino benzoxazine resin, vinyl-containing benzoxazine resin, or a combination thereof. The diamino benzoxazine resin may include oxydianiline benzoxazine resin, diamino bisphenol F benzoxazine resin, diamino diphenyl benzoxazine resin, or a combination thereof. For example, the benzoxazine resin may be, but not limited to, a benzoxazine resin LZ-8260, LZ-8270, LZ-8280, LZ-8290 or LPY 11051 available from Huntsman, a benzoxazine resin PF-3500 available from Chang Chun Plastics or a benzoxazine resin HFB-2006M available from Showa High Polymer.

The epoxy resin suitable for the resin composition of the present disclosure may be any epoxy resin known in the field to which this disclosure pertains, including but not limited to bisphenol A epoxy resin, bisphenol F epoxy resin, bisphenol S epoxy resin, bisphenol AD epoxy resin, novolac epoxy resin, trifunctional epoxy resin, tetrafunctional epoxy resin, multifunctional epoxy resin, dicyclopentadiene (DCPD) epoxy resin, phosphorus-containing epoxy resin, p-xylene epoxy resin, naphthalene epoxy resin (e.g., naphthol epoxy resin), benzofuran epoxy resin, isocyanate-modified epoxy resin, or a combination thereof. The novolac epoxy resin may be phenol novolac epoxy resin, bisphenol A novolac epoxy resin, bisphenol F novolac epoxy resin, biphenyl novolac epoxy resin, phenol benzaldehyde epoxy resin, phenol aralkyl novolac epoxy resin or o-cresol novolac epoxy resin, wherein the phosphorus-containing epoxy resin may be DOPO epoxy resin, DOPO-HQ epoxy resin or a combination thereof. The aforesaid DOPO epoxy resin may comprise DOPO-containing phenol novolac epoxy resin, DOPO-containing o-cresol novolac epoxy resin, DOPO-containing bisphenol-A novolac epoxy resin, or a combination thereof; the aforesaid DOPO-HQ epoxy resin may comprise DOPO-HQ-containing phenol novolac epoxy resin, DOPO-HQ-containing o-cresol novolac epoxy resin, DOPO-HQ-containing bisphenol-A novolac epoxy resin, or a combination thereof.

The organic silicone resin suitable for the resin composition of the present disclosure may be any organic silicone resin known in the field to which this disclosure pertains, including but not limited to polyalkylsiloxane, polyarylsiloxane, polyalkarylsiloxane, modified polysiloxane or a combination thereof. Preferably, the organic silicone resin suitable for the present disclosure is an amino-modified organic silicone resin, such as but not limited to amino-modified organic silicone resins KF-8010, X-22-161A, X-22-161B, KF-8012, KF-8008, X-22-9409, and X-22-1660B-3 available from Shin-Etsu Chemical Co., Ltd., amino-modified organic silicone resins BY-16-853U, BY-16-853, and BY-16-853B available from Toray-Dow Corning Co., Ltd., amino-modified organic silicone resins XF42-C5742, XF42-C6252 and XF42-C5379 available from Momentive Performance Materials JAPAN LLC, or a combination thereof.

The cyanate ester resin suitable for the resin composition of the present disclosure is not particularly limited and may be any cyanate ester resin with an Ar—O—C≡N structure, wherein Ar represents a substituted or unsubstituted aromatic group. Examples of the cyanate ester resin of the present disclosure include but are not limited to novolac cyanate ester resin, bisphenol A cyanate ester resin, bisphenol F cyanate ester resin, dicyclopentadiene-containing cyanate ester resin, naphthalene-containing cyanate ester resin, phenolphthalein cyanate ester resin, adamantane cyanate ester resin, fluorene cyanate ester resin or a combination thereof. The novolac cyanate ester resin may comprise bisphenol A novolac cyanate ester resin, bisphenol F novolac cyanate ester resin, phenol novolac cyanate ester resin or a combination thereof. For example, the cyanate ester resin may be available under the product name Primaset PT-15, PT-30S, PT-60S, BA-200, BA-230S, BA-3000S, BTP-2500, BTP-6020S, DT-4000, DT-7000, ULL-950S, HTL-300, CE-320, LVT-50 or LeCy sold by Arxada AG., but not limited thereto.

The active ester suitable for the resin composition of the present disclosure may be any active polyester resin known in the field to which this disclosure pertains, including but not limited to various commercially available active polyester resin products. Examples include, but not limited to, active polyester resin products HPC-8000 and HPC-8150 available from D.I.C. Corporation.

The phenolic resin suitable for the resin composition of the present disclosure may comprise, but not limited to, mono-functional, bifunctional or multifunctional phenolic resin, comprising phenolic resin of a resin composition conventionally useful for making prepregs, such as phenol resin, phenoxy resin, novolac resin, etc. The novolac resin comprises phenol novolac resin, o-cresol novolac resin or bisphenol A novolac resin.

The styrene maleic anhydride suitable for the resin composition of the present disclosure may comprise any styrene maleic anhydride known in the field to which this disclosure pertains, wherein the molar ratio of styrene (S) to maleic anhydride (MA) may be 1:1, 2:1, 3:1, 4:1, 6:1, 8:1 or 12:1. For example, the styrene maleic anhydride suitable for the present disclosure may include, but not limited to, styrene maleic anhydride such as SMA-1000, SMA-2000, SMA-3000, EF-30, EF-40, EF-60 and EF-80 available from Cray Valley, or styrene maleic anhydride such as C400, C500, C700 and C900 available from Polyscope.

The amine curing agent suitable for the resin composition of the present disclosure may include but not limited to diamino diphenyl sulfone, diamino diphenyl methane, diamino diphenyl ether, diamino diphenyl sulfide, dicyandiamide, or a combination thereof.

The polyamide suitable for the resin composition of the present disclosure may be any polyamide resin known in the field to which this disclosure pertains, including but not limited to various commercially available polyamide resin products.

The polyimide suitable for the resin composition of the present disclosure may be any polyimide resin known in the field to which this disclosure pertains, including but not limited to various commercially available polyimide resin products.

The polymerization inhibitor suitable for the resin composition of the present disclosure is used to inhibit the polymerization reaction, and examples thereof are not particularly limited, which may include various molecule type polymerization inhibitors, stable free radical type polymerization inhibitors or a combination thereof known in the field to which this disclosure pertains. For example, the molecule type polymerization inhibitors suitable for the present disclosure include but are not limited to phenols, quinones, arylamines, arene nitro compounds, sulfur-containing compounds, chlorides of metal with variable valency or a combination thereof. More specifically, the molecule type polymerization inhibitors suitable for the present disclosure include but are not limited to phenol, hydroquinone, 4-tert-butylcatechol, benzoquinone, chloroquinone, 1,4-naphthoquinone, trimethylquinone, aniline, nitrobenzene, $Na_2S$, $FeCl_3$, $CuCl_2$ or a combination thereof. For example, the stable free radical type polymerization inhibitors suitable for the present disclosure include but are not limited to 1,1-diphenyl-2-picrylhydrazyl radical (DPPH), triphenylmethyl radical or a combination thereof.

The silane coupling agent suitable for the resin composition of the present disclosure may comprise silane (such as but not limited to siloxane), and examples include but are not limited to amino silane, epoxide silane, vinyl silane, ester silane, hydroxyl silane, isocyanate silane, methacryloxy silane, acryloxy silane or a combination thereof.

The type of the surfactant suitable for the resin composition of the present disclosure is not particularly limited. The purpose of the surfactant used herein is to ensure uniform distribution of the filler in the resin composition.

The coloring agent suitable for the resin composition of the present disclosure may comprise, but not limited to, dye or pigment.

The purpose of the toughening agent used herein is to improve the toughness of the resin composition. The type of the toughening agent suitable for the resin composition of the present disclosure is not particularly limited. For example, the toughening agent may comprise, but not limited to, carboxyl-terminated butadiene acrylonitrile rubber (CTBN rubber), core-shell rubber, etc.

The purpose of adding solvent to the resin composition according to the present disclosure is to dissolve the components in the resin composition so as to change the solid content of the resin composition and to adjust the viscosity of the resin composition. The type of the solvent suitable for the resin composition of the present disclosure is not particularly limited. For example, the solvent may comprise, but not limited to, methanol, ethanol, ethylene glycol monomethyl ether, acetone, butanone (i.e., methyl ethyl ketone), methyl isobutyl ketone, cyclohexanone, toluene, xylene, methoxyethyl acetate, ethoxyethyl acetate, propoxyethyl acetate, ethyl acetate, propylene glycol methyl ether, dimethyl formamide, dimethyl acetamide, N-methyl-pyrrolidone, or a mixture thereof.

The resin compositions of various embodiments of the present disclosure may be processed by various methods into different articles, including but not limited to a prepreg, a resin film, a laminate or a printed circuit board.

For example, the resin compositions of the present disclosure may be used to make prepregs.

In one embodiment, the prepreg disclosed herein has a reinforcement material and a layered structure formed thereon, wherein the layered structure is made by heating the resin composition at high temperature to a semi-cured state (B-stage). Suitable baking temperature for making the prepreg may be for example 120° C. to 180° C. For example, the reinforcement material may be any one of a fiber material, woven fabric, and non-woven fabric, and the woven fabric preferably comprises fiberglass fabrics. Types of fiberglass fabrics are not particularly limited and may be any commercial fiberglass fabric useful for various printed circuit boards, such as E-glass fiber fabric, D-glass fiber fabric, S-glass fiber fabric, T-glass fiber fabric, L-glass fiber fabric or Q-glass fiber fabric, wherein the fiber may comprise yarns and rovings, in spread form or standard form. Non-woven fabric preferably comprises liquid crystal polymer non-woven fabric, such as polyester non-woven fabric, polyurethane non-woven fabric and so on, but not limited thereto. Woven fabric may also comprise liquid crystal polymer woven fabric, such as polyester woven fabric, polyurethane woven fabric and so on, but not limited thereto. The reinforcement material may increase the mechanical strength of the prepreg. In one preferred embodiment, the reinforcement material can be optionally pretreated by a silane coupling agent. The prepreg may be further heated and cured to the C-stage to form an insulation layer.

In one embodiment, by well mixing each resin composition to form a varnish, loading the varnish into an impregnation tank, impregnating a fiberglass fabric into the impregnation tank to adhere the resin composition onto the fiberglass fabric, and proceeding with heating and baking at a proper temperature to a semi-cured state, a prepreg may be obtained.

For example, the article made from the resin composition disclosed herein may be a resin film which is prepared by heating and baking the resin composition to the semi-cured state. For example, by selectively coating the resin composition on a liquid crystal polymer film, a polyethylene terephthalate film (PET film) or a polyimide film, followed by heating and baking at a proper temperature to a semi-cured state, a resin film may be obtained. For example, the resin composition from each embodiment may also be coated on a copper foil to uniformly adhere the resin composition thereon, followed by heating and baking at a proper temperature to a semi-cured state to obtain the resin film.

For example, the resin composition of the present disclosure may be made into a laminate, which comprises at least two metal foils and at least one insulation layer disposed between the metal foils, wherein the insulation layer is made by curing the resin composition at high temperature and high pressure to the C-stage, a suitable curing temperature being for example between 190° C. and 220° C. and preferably between 200° C. and 210° C. and a suitable curing time being 90 to 180 minutes and preferably 120 to 150 minutes. The insulation layer may be obtained by curing the aforesaid prepreg or resin film. The metal foil may contain copper, aluminum, nickel, platinum, silver, gold or alloy thereof, such as a copper foil. In a preferred embodiment, the laminate is a copper-clad laminate.

In one embodiment, the laminate may be further processed by trace formation processes to obtain a printed circuit board.

In one embodiment of making the printed circuit board according to the present disclosure, a double-sided copper-clad laminate (such as product EM-827, available from Elite Material Co., Ltd.) with a thickness of 28 mil and having a 1-ounce (oz) HTE (high temperature elongation) copper foil may be used and subjected to drilling and then electroplating, so as to form electrical conduction between the top layer copper foil and the bottom layer copper foil. Then the top layer copper foil and the bottom layer copper foil are etched to form inner layer circuits. Then brown oxidation and roughening are performed on the inner layer circuits to form uneven structures on the surface to increase roughness. Next, a vacuum lamination apparatus is used to laminate the assembly of a copper foil, the prepreg, the inner layer circuit board, the prepreg and a copper foil stacked in said order by heating at 190° C. to 220° C. for 90 to 180 minutes to cure the insulation material of the prepregs. Next, black oxidation, drilling, copper plating and other known circuit board processes are performed on the outmost copper foils so as to obtain the printed circuit board.

In one or more embodiments, the resin composition of the present disclosure and various articles made therefrom may preferably have any one, more or all of the following properties:

a comparative tracking index as measured by reference to ASTM D3638 of greater than or equal to 300 V, such as between 300 V and 400 V;

a breakdown voltage as measured by reference to IPC-TM-650 2.5.6.3 of greater than or equal to 40 kV, such as between 40 kV and 50 kV;

a dissipation factor at 10 GHz as measured by reference to JIS C2565 of less than or equal to 0.0047, such as between 0.0038 and 0.0047; and a copper foil peeling strength as measured by reference to IPC-TM-650 2.4.8 of greater than or equal to 2.80 lb/in, such as between 2.80 lb/in and 3.80 lb/in.

The resin compositions of various Examples (Table 1 and Table 2) and Comparative Examples (Table 3) of the present disclosure are formulated and further fabricated to prepare test samples or articles.

The names of reagents used in the Examples and Comparative Examples are as follows:

Polyphenylene ether resins of Formula (1): Synthesis Example 1 to Synthesis Example 4, prepared by the Applicant.

Other polyphenylene ether resin: methacryloyl polyphenylene ether resin, product name SA9000, available from Sabic.

Other polyphenylene ether resin: vinylbenzyl polyphenylene ether resin, product name OPE-2st, available from Mitsubishi Gas Chemical Co., Inc.

Other polyphenylene ether resin: diamino-terminated polyphenylene ether resin (diamino-PPO), as shown by Formula (16), wherein a and b are individually an integer of 1 to 10, available from Sabic.

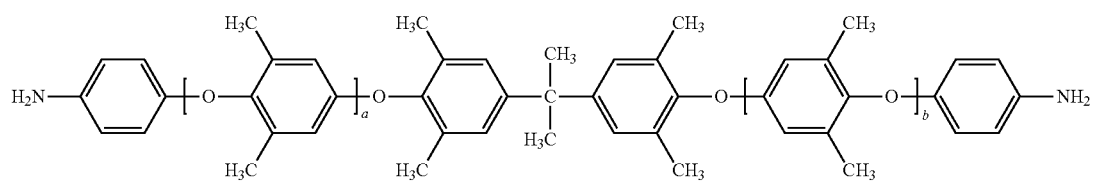

Formula (16)

- p-Phthalaldehyde: product name P837166, available from Macklin.
- p-Aminophenol: product name A800865, available from Macklin.
- 4-Chloro-methyl styrene: product name V875828, available from Macklin.
- Maleimide resin: 3,3'-dimethyl-5,5'-diethyl-4,4'-diphenylmethane bismaleimide, product name BMI-70, available from K.I Chemical Industry Co., Ltd.
- Maleimide resin: bisphenol A diphenyl ether bismaleimide, product name BMI-80, available from K.I Chemical Industry Co., Ltd.
- Unsaturated C=C double bond-containing crosslinking agent: triallyl isocyanurate, product name TAIC, available from Kingyorker Enterprise Co., Ltd.
- Polyolefin: styrene-butadiene copolymer, product name Ricon 100, available from Cray Valley.
- Polyolefin: polybutadiene, product name B-3000, available from Nippon Soda Co., Ltd.
- Polyolefin: hydrogenated styrene-butadiene block copolymer, product name H1052, available from Asahi Kasei Corp.
- Flame retardant: resorcinol bis(dixylenyl phosphate), product name PX-200, available from Daihachi Chemical Industry Co., Ltd.
- Flame retardant: bis(vinylbenzyl)-terminated DOPO flame retardant (vinyl-DOPO), as shown by Formula (17), wherein $Q_1$ to $Q_5$ are independently a hydrogen atom or a methyl group, available from Chin Yee Chemical Co., Ltd.

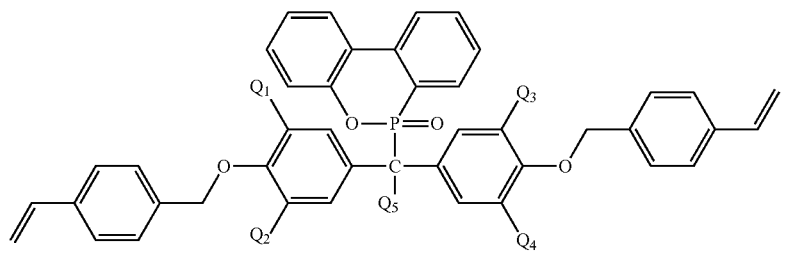

Formula (17)

- Filler: spherical silica, product name SC-2050 SXJ, available from Admatechs.
- Filler: hexagonal boron nitride (h-BN), product name CFP007ST, available from 3M.
- Filler: single-crystal alumina, product name AA5, available from Sumitomo Chemical Co., Ltd.
- Filler: titanium dioxide, product name HT0210, available from Prior Company Limited.
- Curing accelerator: 2,5-dimethyl-2,5-di(t-butylperoxy)-3-hexyne, product name 25B, available from NOF Corporation.
- Curing accelerator: dicumyl peroxide, product name DCP, available from Seebio Biotech Co., Ltd.
- Solvent: toluene and methyl ethyl ketone (MEK), available from Sinopec Group.

TABLE 1

| Resin compositions of Examples (in part by weight) and test results | | | | | | | |
|---|---|---|---|---|---|---|---|
| Composition | | E1 | E2 | E3 | E4 | E5 | |
| polyphenylene ether resin of Formula (1) | Synthesis Example 1 | 100 | 100 | 100 | 100 | 100 | |
| | Synthesis Example 2 | | | | | | |
| | Synthesis Example 3 | | | | | | |
| | Synthesis Example 4 | | | | | | |

TABLE 1-continued

| | | | | | | |
|---|---|---|---|---|---|---|
| other polyphenylene ether resin | SA9000 | | | | | |
| | OPE-2st | | | | | |
| | diamino-PPO | | | | | |
| p-phthalaldehyde | | | | | | |
| p-aminophenol | | | | | | |
| 4-chloro-methyl styrene | | | | | | |
| maleimide resin | BMI-70 | | 20 | 5 | 15 | 15 |
| | BMI-80 | | | | 10 | 10 |
| unsaturated C=C double bond-containing crosslinking agent | TAIC | | 50 | 15 | 35 | 35 |
| polyolefin | Ricon 100 | | | | | |
| | B-3000 | | | | | |
| | H1052 | | | | | |
| flame retardant | PX-200 | | | | | |
| | vinyl-DOPO | | | | | |
| filler | SC-2050 SXJ | 100 | 70 | 70 | 70 | 90 |
| | CFP007ST | | 15 | 5 | 5 | 5 |
| | AA5 | | 15 | 5 | 20 | 5 |
| | HT0210 | | | 20 | 5 | 5 |
| curing accelerator | 25B | 1 | 1 | 1 | 1 | 1 |
| | DCP | | | | | |
| solvent | toluene | 100 | 100 | 100 | 100 | 100 |
| | MEK | 50 | 50 | 50 | 50 | 50 |

| Property | Unit | E1 | E2 | E3 | E4 | E5 |
|---|---|---|---|---|---|---|
| comparative tracking index | V | 300 | 350 | 350 | 350 | 350 |
| breakdown voltage | kV | 40 | 45 | 42 | 42 | 45 |
| dissipation factor | none | 0.0043 | 0.0047 | 0.0045 | 0.0044 | 0.0047 |
| copper foil peeling strength | lb/in | 3.50 | 3.65 | 3.56 | 3.45 | 3.68 |

TABLE 2

Resin compositions of Examples (in part by weight) and test results

| Composition | | E6 | E7 | E8 | E9 | E10 |
|---|---|---|---|---|---|---|
| polyphenylene ether resin of Formula (1) | Synthesis Example 1 | 100 | 100 | | | |
| | Synthesis Example 2 | | | 100 | | |
| | Synthesis Example 3 | | | | 100 | |
| | Synthesis Example 4 | | | | | 100 |
| other polyphenylene ether resin | SA9000 | | | | | |
| | OPE-2st | | | | | |
| | diamino-PPO | | | | | |
| p-phthalaldehyde | | | | | | |
| p-aminophenol | | | | | | |
| 4-chloro-methyl styrene | | | | | | |
| maleimide resin | BMI-70 | 5 | 15 | | | |
| | BMI-80 | 5 | 15 | | | |
| unsaturated C=C double bond-containing crosslinking agent | TAIC | 30 | 30 | | | |
| polyolefin | Ricon 100 | 5 | 10 | | | |
| | B-3000 | 5 | 5 | | | |
| | H1052 | 5 | 15 | | | |
| flame retardant | PX-200 | 5 | 15 | | | |
| | vinyl-DOPO | 5 | 40 | | | |
| filler | SC-2050 SXJ | 10 | 120 | 100 | 100 | 100 |
| | CFP007ST | 5 | | | | |
| | AA5 | 5 | 30 | | | |
| | HT0210 | | 50 | | | |
| curing accelerator | 25B | 0.5 | 1.5 | 1 | 1 | 1 |
| | DCP | | 0.3 | | | |
| solvent | toluene | 150 | 120 | 100 | 100 | 100 |
| | MEK | 40 | 55 | 50 | 50 | 50 |

TABLE 2-continued

| Property | Unit | E6 | E7 | E8 | E9 | E10 |
|---|---|---|---|---|---|---|
| comparative tracking index | V | 380 | 400 | 300 | 300 | 300 |
| breakdown voltage | kV | 48 | 50 | 40 | 40 | 40 |
| dissipation factor | none | 0.0043 | 0.0038 | 0.0043 | 0.0047 | 0.0045 |
| copper foil peeling strength | lb/in | 3.63 | 3.61 | 2.80 | 3.80 | 3.40 |

TABLE 3

Resin compositions of Comparative Examples (in part by weight) and test results

| Composition | | C1 | C2 | C3 | C4 | C5 | C6 | C7 |
|---|---|---|---|---|---|---|---|---|
| polyphenylene ether resin of Formula (1) | Synthesis Example 1 | | | | | | | |
| | Synthesis Example 2 | | | | | | | |
| | Synthesis Example 3 | | | | | | | |
| | Synthesis Example 4 | | | | | | | |
| other polyphenylene ether resin | SA9000 | 100 | | 100 | | | | |
| | OPE-2st | | 100 | | 100 | | | |
| | diamino-PPO | | | | | 100 | 100 | 62 |
| p-phthalaldehyde | | | | | | | | 7 |
| p-aminophenol | | | | | | | | 8 |
| 4-chloro-methyl styrene | | | | | | | | 23 |
| maleimide resin | BMI-70 | | | | | 20 | 20 | 20 |
| | BMI-80 | | | | | | | |
| unsaturated C=C double bond-containing crosslinking agent | TAIC | | | | | 50 | 50 | 50 |
| polyolefin | Ricon 100 | | | | | | | |
| | B-3000 | | | | | | | |
| | H1052 | | | | | | | |
| flame retardant | PX-200 | | | | | | | |
| | vinyl-DOPO | | | | | | | |
| filler | SC-2050 SXJ | 100 | 100 | 70 | 70 | 70 | 70 | 70 |
| | CFP007ST | | | | 30 | 15 | 20 | 15 |
| | AA5 | | | 30 | | 15 | 5 | 15 |
| | HT0210 | | | | | | 5 | |
| curing accelerator | 25B | 1 | 1 | 1 | 1 | 1 | 1 | 1 |
| | DCP | | | | | | | |
| solvent | toluene | 100 | 100 | 100 | 100 | 100 | 100 | 100 |
| | MEK | 50 | 50 | 50 | 50 | 50 | 50 | 50 |

| Property | Unit | C1 | C2 | C3 | C4 | C5 | C6 | C7 |
|---|---|---|---|---|---|---|---|---|
| comparative tracking index | V | 200 | 200 | 250 | 250 | 180 | 185 | 200 |
| breakdown voltage | kV | 25 | 25 | 30 | 30 | 34 | 36 | 30 |
| dissipation factor | none | 0.0041 | 0.0031 | 0.0040 | 0.0030 | 0.0057 | 0.0058 | 0.0060 |
| copper foil peeling strength | lb/in | 3.05 | 3.25 | 3.10 | 3.40 | 3.01 | 2.98 | 2.50 |

The reagents prepared by the Applicant used in Examples are described as follows:

Synthesis Example 1

200 g of toluene was used to dissolve 125 g of diamino-terminated polyphenylene ether (as shown in Formula (16), wherein a and b are each independently an integer of 1 to 10), 13.4 g of p-phthalaldehyde and 16.3 g of p-aminophenol, and reacted at 90° C. for 1 hour, followed by adding 45.6 g of 4-chloro-methyl styrene and 100 g of 50% mass fraction of NaOH solution (relative to 1 mole of diamino-terminated polyphenylene ether, the amount of p-phthalaldehyde is 2 moles, the amount of p-aminophenol is 3 moles, and the amount of 4-chloro-methyl styrene is 6.6 moles). The mixture was reacted at 90° C. for 1 hour. After the reaction was completed, the mixture was cooled to room temperature, washed with water, and purified to obtain the polyphenylene ether resin of Formula (9), which has a number average molecular weight of about 4500, wherein n is an integer of 1 to 10, $A_1$ is shown in Formula (18), and a and b are individually an integer of 1 to 10.

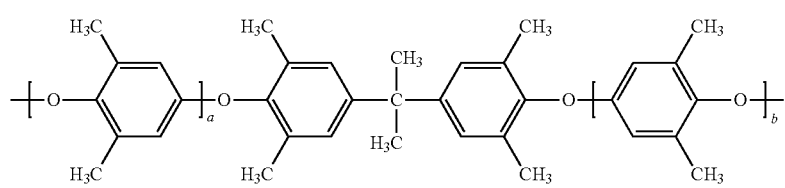

Formula (18)

Synthesis Example 2

200 g of toluene was used to dissolve 125 g of diamino-terminated polyphenylene ether (as shown in Formula (16), wherein a and b are each independently an integer of 1 to 10), 13.4 g of p-phthalaldehyde and 16.3 g of p-aminophenol, and reacted at 90° C. for 3.5 hours, followed by adding 45.6 g of 4-chloro-methyl styrene and 100 g of 50% mass fraction of NaOH solution (relative to 1 mole of diamino-terminated polyphenylene ether, the amount of p-phthalaldehyde is 2 moles, the amount of p-aminophenol is 3 moles, and the amount of 4-chloro-methyl styrene is 6.6 moles). The mixture was reacted at 90° C. for 3.5 hours. After the reaction was completed, the mixture was cooled to room temperature, washed with water, and purified to obtain the polyphenylene ether resin of Formula (9), which has a number average molecular weight of about 20000, wherein n is an integer of 1 to 10, $A_1$ is shown in Formula (18), and a and b are individually an integer of 1 to 10.

Synthesis Example 3

200 g of toluene was used to dissolve 125 g of diamino-terminated polyphenylene ether (as shown in Formula (16), wherein a and b are each independently an integer of 1 to 10), 13.4 g of p-phthalaldehyde and 16.3 g of p-aminophenol, and reacted at 90° C. for 1 hour, followed by adding 34.4 g of methacryloyl chloride and 100 g of 50% mass fraction of NaOH solution (relative to 1 mole of diamino-terminated polyphenylene ether, the amount of p-phthalaldehyde is 2 moles, the amount of p-aminophenol is 3 moles, and the amount of methacryloyl chloride is 6.6 moles). The mixture was reacted at 90° C. for 1 hour. After the reaction was completed, the mixture was cooled to room temperature, washed with water, and purified to obtain the polyphenylene ether resin of Formula (10), which has a number average molecular weight of about 4500, wherein n is an integer of 1 to 10, $A_1$ is shown in Formula (18), and a and b are individually an integer of 1 to 10.

Synthesis Example 4

200 g of toluene was used to dissolve 125 g of diamino-terminated polyphenylene ether (as shown in Formula (16), wherein a and b are each independently an integer of 1 to 10), 13.4 g of p-phthalaldehyde and 16.3 g of p-aminophenol, and reacted at 90° C. for 1 hour, followed by adding 25.2 g of allyl chloride and 100 g of 50% mass fraction of NaOH solution (relative to 1 mole of diamino-terminated polyphenylene ether, the amount of p-phthalaldehyde is 2 moles, the amount of p-aminophenol is 3 moles, and the amount of allyl chloride is 6.6 moles). The mixture was reacted at 90° C. for 1 hour. After the reaction was completed, the mixture was cooled to room temperature, washed with water, and purified to obtain the polyphenylene ether resin of Formula (11), which has a number average molecular weight of about 4500, wherein n is an integer of 1 to 10, $A_1$ is shown in Formula (18), and a and b are individually an integer of 1 to 10.

For the property tests of Examples E1 to E10 and Comparative Examples C1 to C7 listed in Table 1 to Table 3, samples (specimens) were prepared as described below and tested under specified conditions as follows.

1. Prepreg: Resin composition from each Example (listed in Tables 1 and 2) or each Comparative Example (listed in Table 3) was individually well-mixed to form a varnish, which was then loaded to an impregnation tank; a fiberglass fabric available from Asahi (e.g., 1078 E-glass fiber fabric) was impregnated into the impregnation tank to adhere the resin composition onto the fiberglass fabric, followed by heating at 130° C. to 170° C. to a semi-cured stage (B-stage) to obtain a prepreg.
2. Copper-containing laminate (8-ply, formed by lamination of eight prepregs): Two 0.5-ounce reverse treatment foils (RTF) and eight prepregs obtained from 1078 E-glass fiber fabrics impregnated with each sample (Each Example or Comparative Example) and having a resin content of about 62 wt % were prepared and stacked in the order of one RTF copper foil, eight prepregs and one RTF copper foil, followed by lamination under vacuum at 420 psi and 200° C. for 2 hours to form a copper-containing laminate (8-ply).
3. Copper-free laminate (8-ply, formed by lamination of eight prepregs): Each aforesaid copper-containing laminate (8-ply, formed by lamination of eight prepregs) was etched to remove the two copper foils to obtain a copper-free laminate (8-ply), which is formed by laminating eight sheets of prepregs and has a resin content of about 62 wt %.
4. Copper-free laminate (18-ply, formed by lamination of eighteen prepregs): Two 0.5-ounce reverse treatment foils (RTF) and eighteen prepregs obtained from 1078 E-glass fiber fabrics impregnated with each sample (Each Example or Comparative Example) and having a resin content of about 62 wt % were prepared and stacked in the order of one RTF copper foil, eighteen prepregs and one RTF copper foil, followed by lamination under vacuum at 420 psi and 200° C. for 2 hours to form a copper-containing laminate. Each aforesaid copper-containing laminate was etched to remove the two copper foils to obtain a copper-free laminate (18-ply), which is formed by laminating eighteen sheets of prepregs and has a resin content of about 62 wt %.
5. Copper-free laminate (2-ply, formed by lamination of two prepregs): Two 0.5-ounce reverse treatment foils (RTF) and two prepregs obtained from 1078 E-glass fiber fabrics impregnated with each sample (Each Example or Comparative Example) were prepared and stacked in the order of one RTF copper foil, two prepregs and one RTF copper foil, followed by lamination under vacuum at 420 psi and 200° C. for 2 hours to form a copper-containing laminate (2-ply, formed by lamination of two prepregs). Next, each aforesaid copper-containing laminate was etched to remove the copper foils on both sides to obtain a copper-free laminate (2-ply), which is formed by laminating two prepregs and has a resin content of about 62 wt %.

Each sample was analyzed as described below.

1. Comparative Tracking Index

The aforesaid copper-free laminate (obtained by laminating eighteen prepregs) sample with a size of 100 mm*100 mm*3 mm was tested by reference to the processes described in ASTM D3638. During the test, a 100 V voltage was applied to the sample on the tester, followed by addition of one drop of 0.1 wt % ammonium chloride aqueous solution every 30 seconds until tracking was formed, and the total number of drops added before tracking was recorded. If tracking was not formed after the addition of 50 drops, the voltage was increased by 5 V to 105 V to test and record the tolerable voltage value of the sample. A voltage increment of 5 V was applied per increase, and the voltage test range was from 100 V to 400 V. The unit used in the comparative tracking index test is voltage (abbreviated as "V").

2. Breakdown Voltage (BDV)

The aforesaid copper-free laminate sample (obtained by laminating eight prepregs) with a size of 75 mm*50 mm*1.6 mm was tested by reference to IPC-TM-650 2.5.6.3. The sample was immersed in insulating oil (i.e., transformer oil, available from Sinopec Lubricant Co., Ltd.), and the voltage was applied to the sample from 0 V at an increase rate of 500 V per second by the test apparatus; when the leakage current was greater than 5 mA, the voltage value was recorded as the breakdown voltage. The unit of the breakdown voltage is kilo-voltage (abbreviated as "kV").

3. Dissipation Factor (Df)

The aforesaid copper-free laminate (2-ply, obtained by laminating two prepregs) sample was tested by using a microwave dielectrometer available from AET Corp. by reference to JIS C2565 at 10 GHz at room temperature (about 25° C.) for analyzing each specimen. Lower dissipation factor represents better dielectric properties. A difference in dissipation factor of greater than or equal to 0.001 represents a substantial difference (i.e., significant technical difficulty).

4. Copper Foil Peeling Strength (i.e., Peeling Strength, P/S)

The copper-containing laminate (obtained by laminating eight prepregs) sample was tested by using a tensile strength tester by reference to IPC-TM-650 2.4.8 to measure the copper foil peeling strength. Higher peeling strength represents stronger bonding strength between the copper foil and the insulation layer. The unit of the copper foil peeling strength is pound/inch (abbreviated as "lb/in").

The following observations can be made from Table 1 to Table 3.

From the comparison of Examples E1 and E8-E10 using the polyphenylene ether resin of Formula (1) according to the present disclosure and Comparative Examples C1 and C2 using other polyphenylene ether resins, the property test results indicate that Examples E1 and E8-E10 have excellent comparative tracking index and breakdown voltage and maintain better dissipation factor and copper foil peeling strength at the same time. From the comparison of Example E2 using the polyphenylene ether resin of Formula (1) according to the present disclosure and Comparative Example C5 using diamino-terminated polyphenylene ether resin (having a structure of Formula (16)), the property test results indicate that Example E2 has excellent comparative tracking index and breakdown voltage and maintains better dissipation factor and copper foil peeling strength at the same time.

From the comparison of Example E1 and Examples E2-E7 disclosed herein, it can be observed that using the polyphenylene ether resin of Formula (1) according to the present disclosure in conjunction with one or more of maleimide resin, unsaturated C=C double bond-containing crosslinking agent and polyolefin may further improve the comparative tracking index and the breakdown voltage and maintain better dissipation factor and copper foil peeling strength. From the comparison of Example E1 and Example E8 disclosed herein, it can be observed that the lower the number average molecular weight of the polyphenylene ether resin of Formula (1), the higher the copper foil peeling strength.

From the comparison of Comparative Examples C1 and C3, and the observation of Comparative Examples C2 and C4, it can be observed that the use of different types of filler combinations still fails to achieve satisfactory results in terms of comparative tracking index and breakdown voltage. Similarly, from the observation of Comparative Example C5 and Comparative Example C6, it can be observed that even with more different types of filler combinations, it still fails to achieve satisfactory results in terms of comparative tracking index and breakdown voltage.

In addition, from the comparison of Example E2 according to the present disclosure and Comparative Example C7, it can be observed that, instead of using the polyphenylene ether resin of Formula (1), if articles are made by using the raw materials required for the manufacture of the polyphenylene ether resin of Formula (1) of the present disclosure, such as diamino-terminated polyphenylene ether resin (having a structure of Formula (16)), p-phthalaldehyde, p-aminophenol and 4-chloro-methyl styrene, it will fail to achieve satisfactory results in terms of comparative tracking index, breakdown voltage, dissipation factor and copper foil peeling strength.

The above detailed description is merely illustrative in nature and is not intended to limit the embodiments of the subject matter or the applications and uses of such embodiments. As used herein, the term "exemplary" or similar expression means "serving as an example, instance, or illustration." Any implementation described herein as exemplary is not necessarily to be construed as preferred or advantageous over other implementations, unless otherwise specified.

Moreover, while at least one exemplary example or comparative example has been presented in the foregoing detailed description, it should be appreciated that a vast number of variations exist. It should also be appreciated that the exemplary one or more embodiments described herein are not intended to limit the scope, applicability, or configuration of the claimed subject matter in any way. Rather, the foregoing detailed description will provide those skilled in the art with a convenient guide for implementing the described one or more embodiments and equivalents thereof. Also, the scope defined by the claims includes known equivalents and foreseeable equivalents at the time of filing this patent application.

What is claimed is:

1. A resin composition comprising a polyphenylene ether resin of Formula (1) and an additive;

Formula (1)

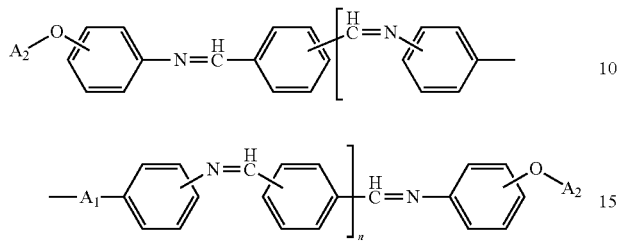

in Formula (1), n is an integer of 1 to 10, $A_1$ has a structure of Formula (2), $A_2$ each independently has a structure of Formula (6), Formula (7) or Formula (8);

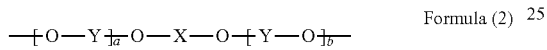
Formula (2)

in Formula (2), a and b are each independently an integer of 0 to 100, and a and b are not 0 at the same time; —O—X—O— has a structure of Formula (3) or Formula (4); Y each independently has a structure of Formula (5);

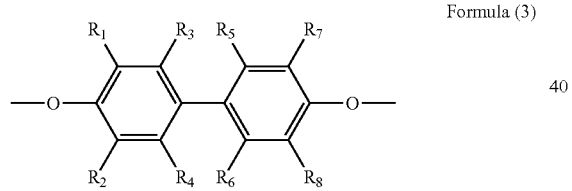
Formula (3)

in Formula (3), $R_1$, $R_2$, $R_7$ and $R_8$ are the same or different and are each independently a C1-C6 alkyl group; $R_3$, $R_4$, $R_5$ and $R_6$ are the same or different and are each independently a hydrogen atom or a C1-C6 alkyl group;

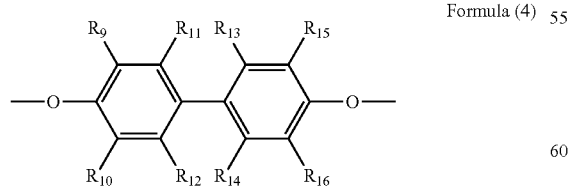
Formula (4)

in Formula (4), $R_9$, $R_{10}$, $R_{11}$, $R_{12}$, $R_{13}$, $R_{14}$, $R_{15}$ and $R_{16}$ are the same or different and are each independently a C1-C6 alkyl group or a hydrogen atom; A is a C1-C6 divalent hydrocarbon group;

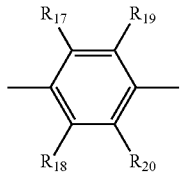
Formula (5)

in Formula (5), $R_{17}$, $R_{18}$, $R_{19}$ and $R_{20}$ are the same or different and are each independently a hydrogen atom or a C1-C6 alkyl group;

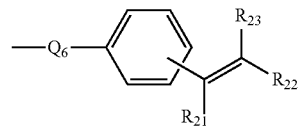
Formula (6)

in Formula (6), $R_{21}$, $R_{22}$ and $R_{23}$ are each independently a hydrogen atom or a C1-C6 alkyl group; $Q_6$ is a C1-C6 divalent alkyl group or is not present;

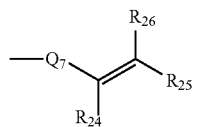
Formula (7)

in Formula (7), $R_{24}$, $R_{25}$ and $R_{26}$ are each independently a hydrogen atom or a C1-C6 alkyl group; $Q_7$ is a C1-C6 divalent alkyl group or is not present;

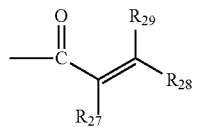
Formula (8)

in Formula (8), $R_{27}$, $R_{28}$ and $R_{29}$ are each independently a hydrogen atom or a C1-C6 alkyl group.

2. The resin composition of claim 1, wherein, in Formula (1), $A_2$ each independently comprises a vinyl group, a (meth)acryloyl group, an allyl group or a vinylbenzyl group.

3. The resin composition of claim 1, wherein the polyphenylene ether resin of Formula (1) comprises a polyphenylene ether resin of Formula (9), a polyphenylene ether resin of Formula (10), a polyphenylene ether resin of Formula (11), a polyphenylene ether resin of Formula (12), a polyphenylene ether resin of Formula (13), a polyphenylene ether resin of Formula (14) or a combination thereof:

Formula (9)
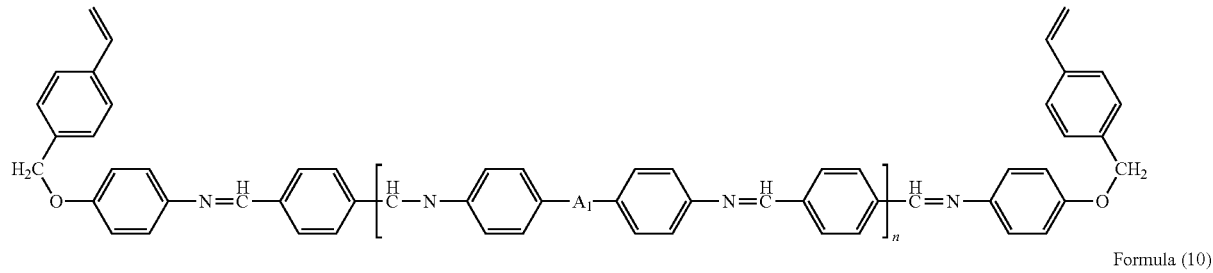

Formula (10)
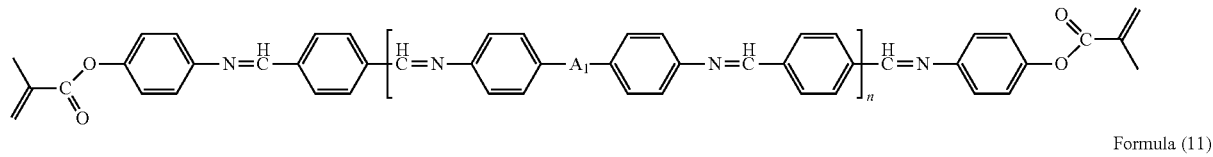

Formula (11)
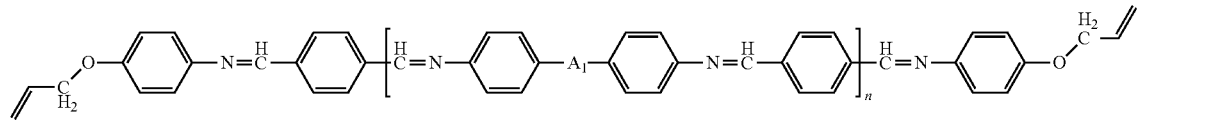

Formula (12)
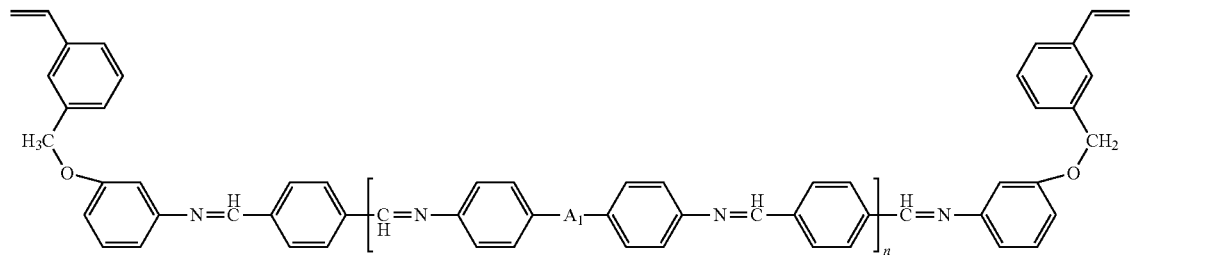

Formula (13)
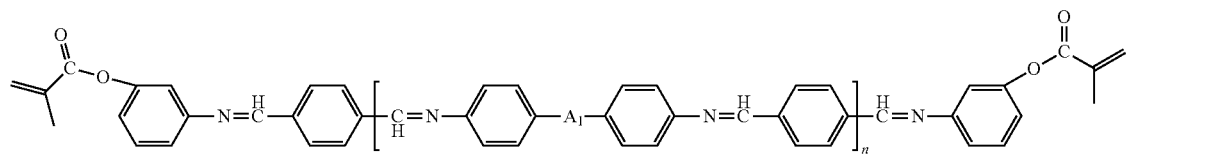

Formula (14)
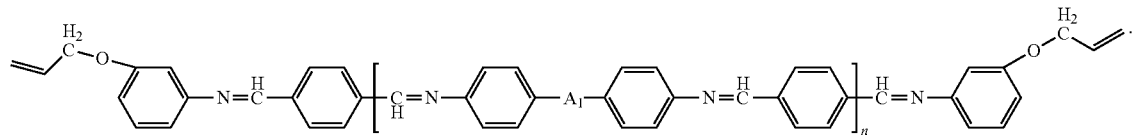

4. The resin composition of claim 1, wherein the additive comprises maleimide resin, unsaturated C═C double bond-containing crosslinking agent, polyolefin, flame retardant, filler, curing accelerator or a combination thereof.

5. The resin composition of claim 4, wherein the unsaturated C═C double bond-containing crosslinking agent is 1,2-bis(vinylphenyl)ethane, bis(vinylbenzyl)ether, divinylbenzene, divinylnaphthalene, divinylbiphenyl, t-butyl styrene, triallyl isocyanurate, triallyl cyanurate, 1,2,4-trivinyl cyclohexane, diallyl bisphenol A, styrene, butadiene, decadiene, octadiene, vinylcarbazole, acrylate or a combination thereof.

6. The resin composition of claim 1, comprising 100 parts by weight of the polyphenylene ether resin of Formula (1) and 0.1 part by weight to 350 parts by weight of the additive.

7. The resin composition of claim 6, wherein the additive comprises 5 parts by weight to 30 parts by weight of maleimide resin, 15 parts by weight to 50 parts by weight of unsaturated C═C double bond-containing crosslinking agent, 15 parts by weight to 30 parts by weight of polyolefin or a combination thereof.

8. The resin composition of claim 1, further comprising benzoxazine resin, epoxy resin, organic silicone resin, cyanate ester resin, active ester, phenolic resin, styrene maleic anhydride, amine curing agent, polyamide, polyimide, polymerization inhibitor, silane coupling agent, surfactant, coloring agent, toughening agent, solvent or a combination thereof.

9. An article made from the resin composition of claim 1, wherein the article comprises a prepreg, a resin film, a laminate, or a printed circuit board.

10. The article of claim 9, having a comparative tracking index as measured by reference to ASTM D3638 of greater than or equal to 300 V.

11. The article of claim 9, having a breakdown voltage as measured by reference to IPC-TM-650 2.5.6.3 of greater than or equal to 40 kV.

12. The article of claim 9, having a dissipation factor at 10 GHz as measured by reference to JIS C2565 of less than or equal to 0.0047.

13. The article of claim 9, having a copper foil peeling strength as measured by reference to IPC-TM-650 2.4.8 of greater than or equal to 2.80 lb/in.

* * * * *